(12) United States Patent
Ricketts et al.

(10) Patent No.: US 11,277,970 B2
(45) Date of Patent: Mar. 22, 2022

(54) AIR DEFLECTOR FOR A COMBINE HARVESTER CLEANING ASSEMBLY

(71) Applicant: CNH Industrial America LLC, New Holland, PA (US)

(72) Inventors: Jonathan Ricketts, Coal Valley, IL (US); Curtis Hillen, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 379 days.

(21) Appl. No.: 16/407,346

(22) Filed: May 9, 2019

(65) Prior Publication Data

US 2019/0343051 A1 Nov. 14, 2019

Related U.S. Application Data

(60) Provisional application No. 62/669,036, filed on May 9, 2018.

(51) Int. Cl.
*A01F 12/44* (2006.01)

(52) U.S. Cl.
CPC .......... *A01F 12/444* (2013.01); *A01F 12/446* (2013.01)

(58) Field of Classification Search
CPC .............................. A01F 12/444; A01F 12/446
See application file for complete search history.

(56) References Cited

U.S. PATENT DOCUMENTS

| | | | | |
|---|---|---|---|---|
| 3,533,413 A | * | 10/1970 | Schenk | A01F 12/444 460/99 |
| 3,566,880 A | | 3/1971 | Riffe | |
| 4,265,077 A | * | 5/1981 | Peters | A01F 12/444 56/14.6 |
| 4,397,319 A | * | 8/1983 | Schuhmacher | B07B 9/00 460/100 |
| 5,376,046 A | * | 12/1994 | Shuknecht | A01D 31/00 171/17 |
| 5,387,154 A | * | 2/1995 | Peters | A01F 12/444 460/100 |

(Continued)

FOREIGN PATENT DOCUMENTS

| | | |
|---|---|---|
| DE | 449731 C | 9/1927 |
| DE | 19501828 A1 | 7/1996 |

(Continued)

OTHER PUBLICATIONS

Extended European Search Report for EP Application No. 19173072.0 dated Oct. 7, 2019 (six pages).

*Primary Examiner* — Arpad Fabian-Kovacs
(74) *Attorney, Agent, or Firm* — Peter Zacharias; Patrick Sheldrake

(57) ABSTRACT

A combine harvester includes a header assembly configured for collecting a crop, a threshing assembly coupled to the header assembly and configured for separating grains of the crop from material other than grain, and a cleaning assembly positioned in association with the threshing assembly and configured for separating the grains from chaff. The cleaning assembly includes a fan assembly having a fan housing with a fan output duct and a fan mounted to the fan housing, and one or more cleaning sieves. The fan assembly is configured to blow air across the one or more cleaning sieves via the fan output duct. The fan output duct includes at least one segmented air deflector.

15 Claims, 4 Drawing Sheets

(56) References Cited

U.S. PATENT DOCUMENTS

| | | | | |
|---|---|---|---|---|
| 5,428,945 | A * | 7/1995 | von Allworden | A01F 12/444 56/12.8 |
| 6,558,252 | B2 * | 5/2003 | Visagie | A01F 12/444 460/100 |
| 6,796,897 | B1 | 9/2004 | Lovett et al. | |
| 7,455,498 | B2 | 11/2008 | Zysman | |
| 8,052,374 | B2 * | 11/2011 | Ricketts | F04D 17/04 415/53.1 |
| 8,608,534 | B1 * | 12/2013 | Stahl | A01F 12/444 460/99 |
| 10,849,276 | B2 * | 12/2020 | Matousek | A01F 12/444 |
| 11,058,055 | B2 * | 7/2021 | Nelson | B60K 5/08 |
| 2008/0004091 | A1 * | 1/2008 | Ricketts | A01F 12/444 460/100 |
| 2017/0251601 | A1 * | 9/2017 | Dugas | A01F 12/444 |
| 2018/0007830 | A1 | 1/2018 | Nelson et al. | |
| 2018/0009305 | A1 * | 1/2018 | Nelson | B60K 11/04 |
| 2018/0027732 | A1 * | 2/2018 | Xu | A01D 41/1277 |
| 2019/0104687 | A1 * | 4/2019 | Thomas | A01F 12/444 |
| 2019/0159404 | A1 * | 5/2019 | Matousek | A01F 12/444 |

FOREIGN PATENT DOCUMENTS

| | | | | |
|---|---|---|---|---|
| EP | 2848113 A1 * | 3/2015 | | A01F 12/444 |
| GB | 2472639 A * | 2/2011 | | A01F 12/444 |
| WO | WO-2008149233 A2 * | 12/2008 | | A01F 12/444 |
| WO | WO-2015147083 A1 * | 10/2015 | | A01F 12/444 |
| WO | 201697639 A1 | 6/2016 | | |

* cited by examiner

AIR DEFLECTOR FOR A COMBINE HARVESTER CLEANING ASSEMBLY

FIELD OF THE INVENTION

The present invention relates to combine harvesters and, more particularly, to combine harvester cleaning assemblies.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to separate or remove the grain. Once the grain is threshed it falls through perforations in the concaves and is transported to a grain pan. From the grain pan the grain is cleaned using a cleaning system and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

The cleaning system of a conventional harvester includes not only the cleaning fan, but also an air deflector positioned adjacent to an output of the fan for distributing the air flow more uniformly over the output and subsequently more uniformly over the sieves. For example, an output of the fan blows through an output duct, and thus air flow is likely stronger behind a center portion of the fan which corresponds to a center portion of the output duct, and weaker through portions of the output duct closer to the edges of the output duct. This may be the result of the geometry of the fan, as well as drag placed on the flow of air from the edges of the output duct (i.e., an edge effect).

FIG. 1 shows a perspective view of a conventional air deflector 100 for use with a fan of a harvester, according to the prior art. The air deflector 100 has a bottom portion 110 configured to be mounted to an output duct, and a top planar portion 120 having a variable height h(x), where x is measure along a length of the air deflector 100. The bottom portion 110 of the air deflector may be mounted to the output duct such that the flow of air 130 impacts the deflector 100 at a non-zero acute angle with respect to a normal of the top planar portion 120. Thus, the stronger air flow 130C, corresponding to air flow in a center portion of an output duct, is not only blocked more than the weaker air flow 130A due to the variable height h(x) of the top planar portion 120, but the stronger air flow 130C is deflected towards the edge portions of the output duct, resulting in a more uniform flow of air downstream of the air deflector.

However, traditional air deflectors, although tending to improve the distribution of air flow, still produce regions of unstable air. Furthermore, as combine harvesters are configured to harvest larger quantities of crop per unit time, larger, wider cleaning systems are required, including not only more powerful fans, but correspondingly wider output ducts for distributing the flow of air generated by the fan over a larger sieve assembly for cleaning a larger quantity of crop per unit time. Thus, as the output ducts and/or the fans and the output ducts become wider, traditional air deflectors create low pressure regions downstream that result in more turbulent (i.e., non-laminar) regions of air flow. In addition, the air drawn in by the fan typically contains dust and other particulates generated by either ambient weather conditions and/or the operation of the harvester in the field. Thus, some particulates of the air tend to drop out of the air stream into the fan assembly, due in part to the creation of low pressure regions and/or regions of turbulence, thereby requiring the fan assembly to be periodically disassembled and cleaned of dust and other debris that settles out.

What is needed in the art is a cleaning system for use with a harvester that can overcome some of the previously described disadvantages of known cleaning systems.

SUMMARY OF THE INVENTION

In accordance with an aspect of the present invention, there is provided a combine harvester, including a header assembly configured for collecting a crop, a threshing assembly coupled to the header assembly and configured for separating grains of the crop from material other than grain, and a cleaning assembly positioned in association with the threshing assembly and configured for separating the grains from chaff. The cleaning assembly includes a fan assembly having a fan housing with a fan output duct and a fan mounted to the fan housing, and one or more cleaning sieves. The fan assembly is configured to blow air across the one or more cleaning sieves via the fan output duct. The fan output duct includes at least one segmented air deflector.

In accordance with another aspect of the present invention, a fan assembly for use with a cleaning assembly of a combine harvester is provided. The fan assembly includes a fan housing having a fan output duct, and a fan mounted to the fan housing. The fan assembly is configured to blow air across one or more cleaning sieves of the cleaning assembly via the fan output duct. The fan output duct includes at least one segmented air deflector.

An advantage of the fan assembly described herein is to provide for a reduction of low pressure areas downstream of the fan assembly, as well as to provide for smoother, less turbulent air flow downstream of the fan assembly, thereby providing a more uniform and more laminar flow of air for cleaning grain collected and threshed by a combine harvester.

Another advantage of reducing low pressure and turbulent regions of air flow associated with a fan assembly is to enable any suspended particulate matter in the incoming air to remain suspended in the air stream as it passes through the fan assembly, thereby reducing the frequency at which the fan assembly is cleaned of particulate debris.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience, but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings." Also the terms "forward", "rearward", "left" and "right", when used in connection with an agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 2:
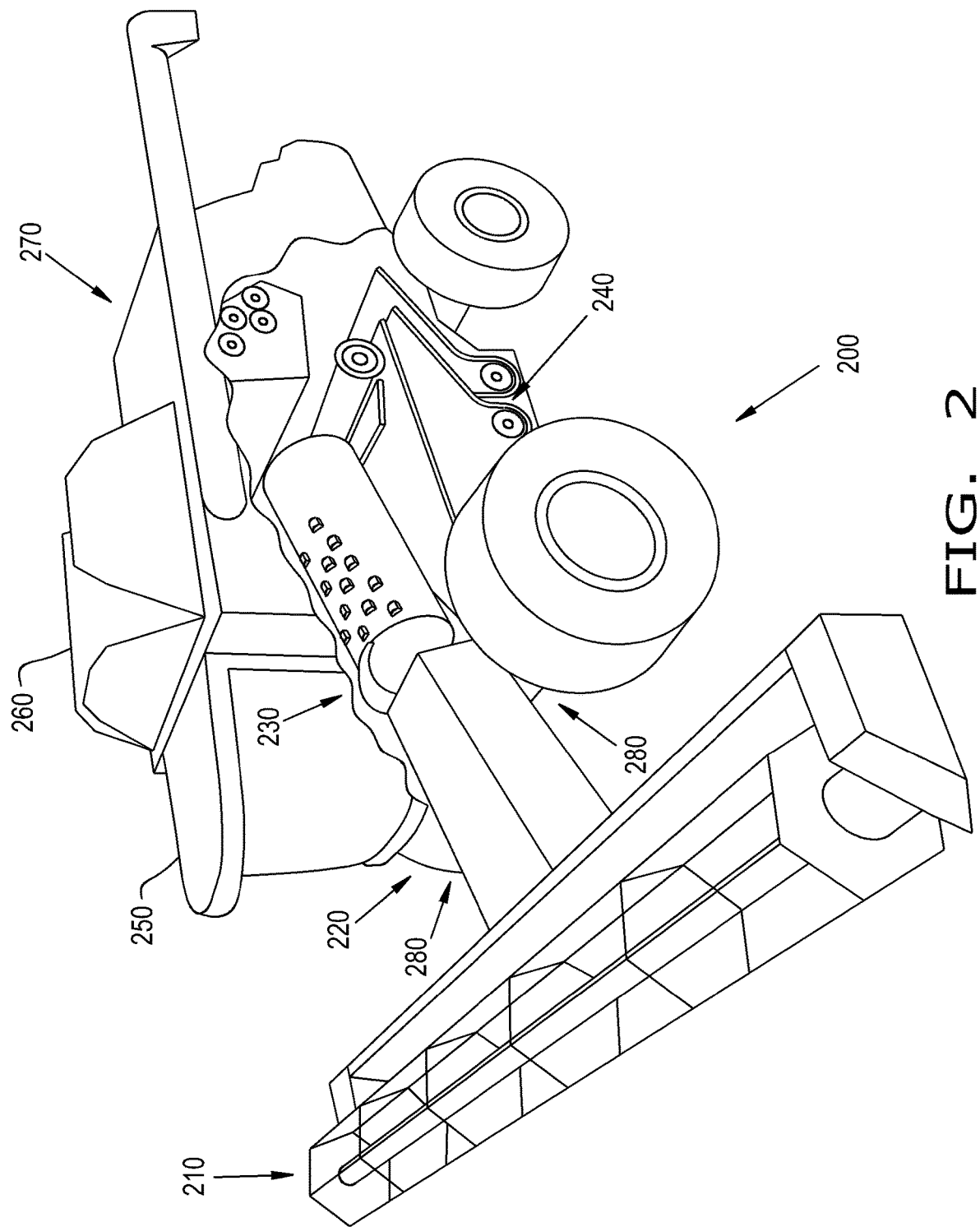
FIG. 2 shows a perspective view of a combine harvester formed in accordance with an embodiment of the present invention.
Figure 3:
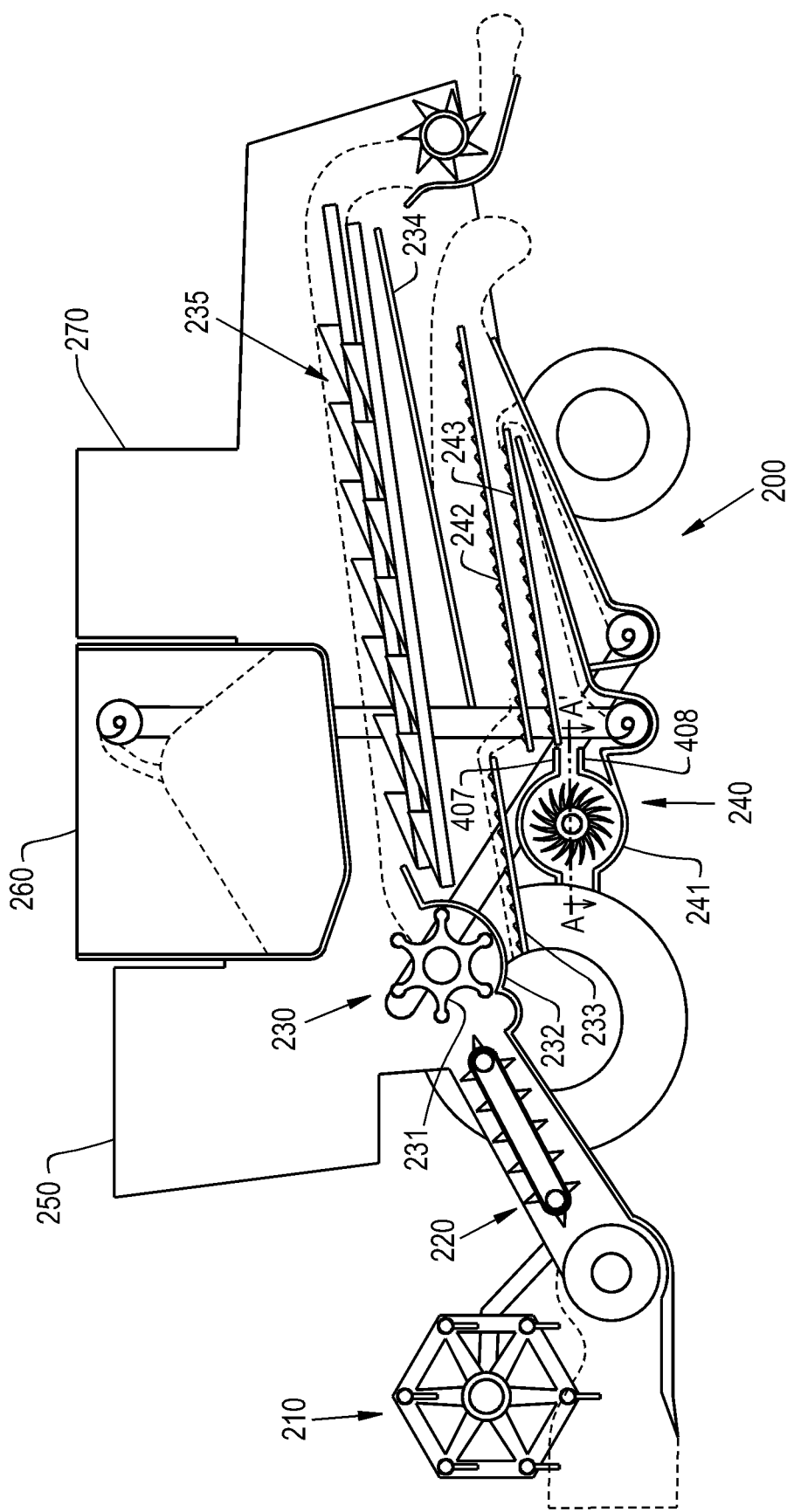
FIG. 3 shows a schematic of the combine harvester of FIG. 2 formed in accordance with an embodiment of the present invention.

Referring now to the drawings, and more particularly to FIGS. 2 and 3, an exemplary embodiment of a combine harvester 200 formed in accordance with an embodiment of the present invention is shown. Combine harvesters are well known in the art, thus only those assemblies and sub-assemblies of a conventional combine harvester that may be relevant to the description of the present invention are illustrated in FIGS. 2 and 3. The combine harvester 200 includes a header assembly 210, a feeder housing 220, a threshing assembly 230 coupled to the header assembly 210 via the feeder housing 220, and a cleaning assembly 240 configured for receiving the threshed crop (i.e., grain) from the threshing assembly 230. The header assembly 210 is configured for collecting a crop, the threshing assembly 230 is configured for separating grains of the crop from material other than grain (MOG), such as stalks, leaves, and cobs, and the cleaning assembly 240 is configured for separating the grains from the chaff. The header and threshing assemblies 210, 230 are conventionally configured and operable.

The threshing assembly 230 includes a threshing drum 231 for separating the MOG from the grain delivered from the header assembly 210. The threshing assembly 230 includes threshing delivery elements, such as a first threshing delivery element 232 (also referred to as a concave), a second threshing delivery element 233, and a third threshing delivery element 234 for delivering, via powered conveyance (e.g., conveyor belts) and/or non-powered conveyance (e.g., tilted surfaces, slides, perforated surfaces) the crop, processed by the threshing drum 231, to the cleaning assembly 240. The threshing assembly 230 includes a fourth delivery element 235, also referred to as a straw walker, that not only transports away straw and other larger debris, but may also have perforations to allow grain swept onto the straw walker by the threshing drum 231 to be transported by one or more other threshing delivery elements (e.g., second and third delivery elements 233, 234), for delivery to the cleaning assembly 240.

In addition, the combine harvester includes a cab 250, a grain storage assembly 260, and an engine 270 coupled to a power-train (not shown) for powering the combine harvester 200 through an agricultural field.

The cleaning assembly 240 (FIG. 3) includes a fan assembly 241 and cleaning sieves, such as a top cleaning sieve 242 and a bottom cleaning sieve 243. Cleaning sieves are well known in the art and will not be discussed further.

Figure 1:
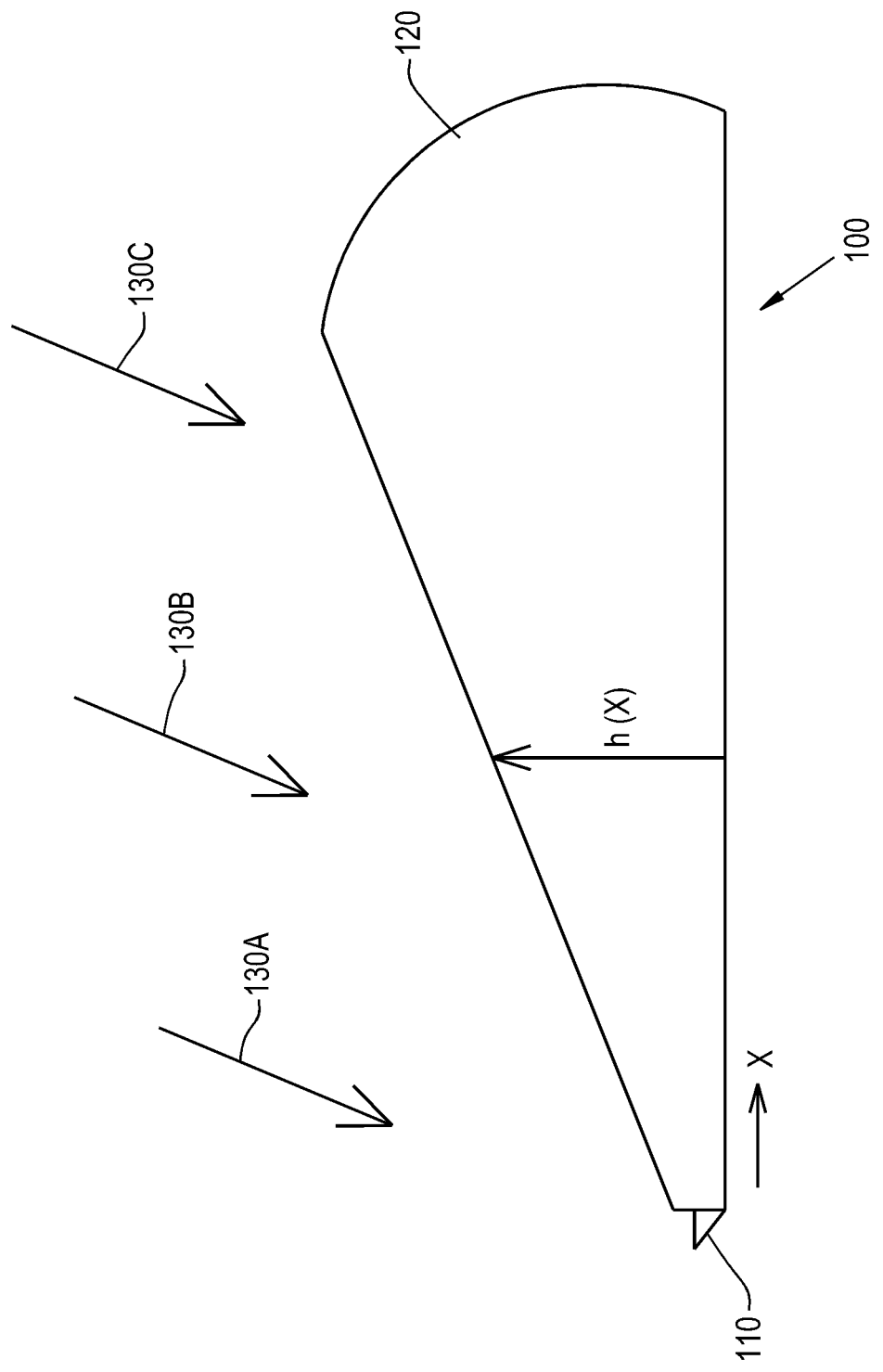
FIG. 1 shows a perspective view of a conventional air deflector for use with a fan assembly of a harvester, according to the prior art.
Figure 4:
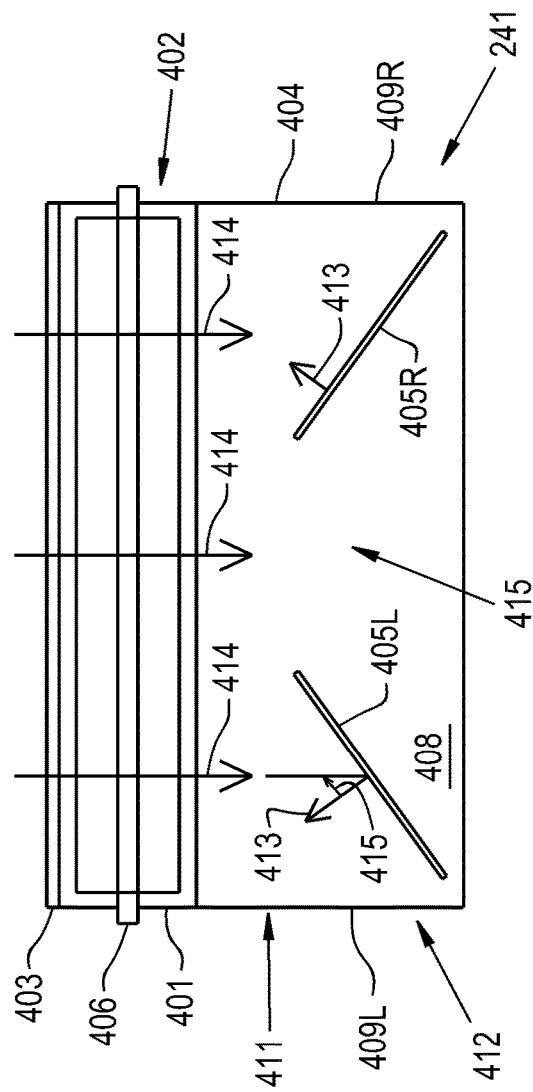
FIG. 4 shows a cross section of the fan assembly of FIG. 3, formed in accordance with an embodiment of the present invention.

FIG. 4 shows a section A-A' of the fan assembly 241 of FIG. 3, according to an embodiment of the present invention. The fan assembly 241 has a fan housing 401, a fan 402 mounted to the fan housing 401, a fan input duct 403 connected to the fan housing 401 (or formed as an extension of the fan housing 401) for drawing in air, typically through a front portion 280 of the combine harvester 200 (FIG. 1), and a fan output duct 404 connected to the fan housing 401 (or formed as an extension of the fan housing 401) through which air is blown (i.e., exits). As illustrated, the fan assembly 241 includes two segmented air deflectors 405L and 405R, however, the scope of the present invention covers fan assemblies having more than two segmented air deflectors, and in other embodiments, each air defector 405L and 405R (described more fully further below) may include a plurality of air deflectors, arranged end-to-end with each other. In a further embodiment, the two segmented air deflectors 405L and 405R are connected or otherwise integrated together to form a single segmented air deflector 405. For example, an end of the segmented air deflector 405L adjacent to an upstream middle portion 415 of the fan output duct 404 is continuous with or joined to an end of the segmented air deflector 405R adjacent to the upstream middle portion 415 of the fan output duct 404 to form a single segmented air deflector 405. For example, in one embodiment, the two segmented air deflectors 405L and 405R are joined via the upper planar portion 503 (FIG. 5) of the lower unsegmented portion 502 (FIG. 5) of the air deflectors 405L and 405R.

The fan 402 may be configured as cylindrical fan, configured to be rotated about a longitudinal axis 406. Although not shown, the fan 402 typically includes a plurality of blades. Cleaning fans are well known in the art, and thus the fan 402 of the fan assembly 241 will not be described in any further detail.

For purposes of the following description, the fan output duct 404 includes a top surface 407 (FIG. 3), a bottom surface 408, a first side surface 409L and a second side surface 409R. A front portion 411 (i.e., an upstream portion) of the fan output duct 404 is adjacent to the fan housing 401 and a back portion 412 (i.e., a downstream portion) of the fan output duct 404 is opposite the front portion 411. An upstream middle portion 415 of the fan output duct 404 is a region approximately midway between the first and second side surfaces 409L, 409R.

Figure 5:
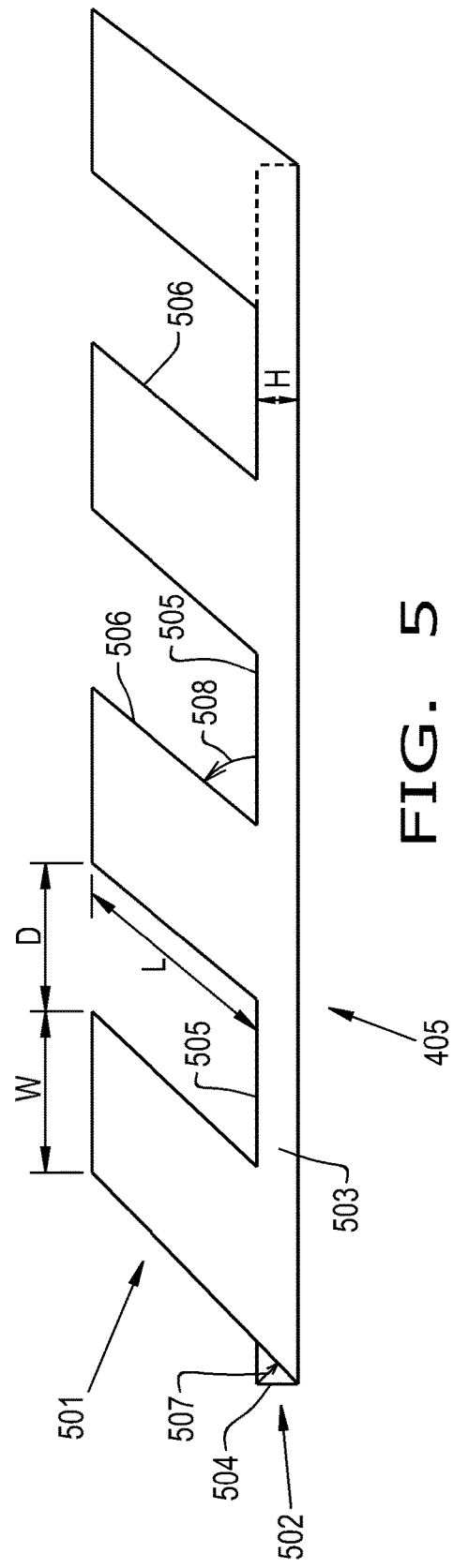
FIG. 5 shows a perspective view of the segmented air deflector of FIG. 4, formed in accordance with an embodiment of the present invention.

FIG. 5 shows a perspective view of a segmented air deflector, e.g., segmented air deflector 405L or segmented air defector 405R, according to an embodiment of the present invention. The segmented air deflector 405 includes an upper segmented portion 501 and a lower unsegmented portion 502. In one embodiment, the upper segmented portion 501 is planar. The lower unsegmented portion 502 may be L-shaped and may include an upper planar portion 503 that is planar with the upper segmented portion 501 and a lower planar portion 504 formed at a second tab angle 507 with respect to the upper planar portion 503. The upper planar portion 503 includes an edge 505 and the upper segmented portion 501 includes a plurality of tabs 506. Each tab of the plurality of tabs 506 extends at a first tab angle 508 with respect to the upper edge 505 of the upper planar portion 503 of the lower unsegmented portion 502.

As illustrated, each tab has a tab length L and a tab width W, and successive tabs are separated by a tab gap D. The upper planar portion 503 of the lower unsegmented portion 502 has an unsegmented height H.

In one embodiment, the first tab angle 508 is approximately 45°, the second tab angle 507 is approximately 90°, the tab length L is 44 mm, the tab width W is 40 mm, the tab gap D is 40 mm and the unsegmented height H is 10 mm. However, the scope of the invention covers any tab angles, tab length, tab width, tab gap, an unsegmented height H, collectively referred to as segmented air deflector parameters. For example, one or more of the segmented air deflector parameters may be dependent upon the speed of air flow through the fan assembly 241, and/or ambient operating conditions, such as an amount of dust and/or average size of particles of dust suspended in the air flowing through the fan assembly 241, and/or ambient atmospheric conditions, such as relative humidity, etc., collectively referred to as operating parameters. In one embodiment, the second tab angle 507 is between 45° and 135°. When the second tab angle 507 is less than 90°, air flow 414 (FIG. 4) will be deflected more towards the bottom surface 408 of the fan output duct 404, and when the second tab angle 507 is greater than 90°, air flow 414 will be deflected more towards the top surface 407 of the fan output duct 404. These adjustments may be made to provide a better distribution of air flow fore and aft.

In one embodiment of the invention, each segmented air deflector, e.g., segmented air deflector 405L or segmented air defector 405R, has segmented air deflector parameters that are constant. That is, each tab of the plurality of tabs 506 of each air deflector 405 has the same dimensions, the gap between each successive pairs of tabs is the same, and the unsegmented height is constant. However, the scope of the invention covers variable segmented air deflector parameters, either within each air deflector 405, or between one or more air deflectors, based, for example, upon the above-described operating parameters, including for example, any non-symmetries in the shape of the fan output duct 404, such as differently shaped first and second side surfaces 409L and 409R.

In one embodiment of the invention, each segmented air deflector 405L and 405R is mounted to the bottom surface 408 of the fan output duct 404 such that air flow 414 through the fan output duct 404, generated by the fan 402, impacts each of the air deflectors 405L and 405R at a deflection angle 415 that is greater than zero degrees as measured with respect to a normal 413 (FIG. 4) to the upper segmented portion 501 of the segmented air deflector 405L and 405R. In one embodiment, the lower planar portion 504 of the lower unsegmented portion 502 is mounted, via welds or fasteners such as screws, bolts, pins and/or hinges, for example, to the bottom surface 408 of the fan output duct 404. However, in another embodiment, the lower planar portion 504 of the lower unsegmented portion 502 is mounted to the top surface 407 of the fan output duct 404, and in a further embodiment at least one segmented air deflector 405 (e.g., the two segmented air deflectors 405L and 405R) is mounted to the bottom surface 408 and at least another one segmented air deflector 405 (e.g., the two segmented air deflectors 405L and 405R) is mounted to the top surface 407.

In operation, the combination of the upper segmented portion 501, which passes some of the air flow, and blocks and redistributes some of the air flow towards the sides 409L, 409R of the output duct 404, and the lower unsegmented portion 502 which blocks and redistributes some of the air flow, provides for a reduction of low pressure areas downstream of the segmented air deflectors 405L, 405R, and smoother, less turbulent air flow downstream of the segmented air deflectors and the output duct 404, thereby providing a more efficient cleaning of the grain. Furthermore, by configuring the tabs 506 to be tilted with respect to the upper edge 505 of the upper planar portion 503 of the lower unsegmented portion 502 (i.e., the first tab angle 508 is less than 90°), and/or configuring the tabs to tilt with respect to the lower planar portion 504 (i.e., the second tab angle 507 is less than 90°), any particulates that may be suspended in the air flow 414 coming into the fan assembly 241 do not settle out of the air flow 414 in the fan assembly 241, but instead are blown out through the fan output duct 404.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combine harvester, comprising:
a header assembly configured for collecting a crop;
a threshing assembly coupled to the header assembly, the threshing assembly configured for separating grains of the crop from material other than grain; and
a cleaning assembly positioned in association with the threshing assembly, the cleaning assembly configured for separating the grains from chaff, the cleaning assembly comprising:
a fan assembly including a fan housing having a fan output duct and a fan mounted to the fan housing; and
one or more cleaning sieves, wherein
said fan assembly is configured to blow air across the one or more cleaning sieves via the fan output duct, and wherein
said fan output duct includes at least one segmented air deflector, each of the at least one segmented air deflector has an upper segmented portion and a lower unsegmented portion, the upper segmented portion includes a plurality of tabs, each of the plurality of tabs having the same dimensions, between successive pairs of tabs there is a gap, the gap being the same and the unsegmented portion having a height that is constant.

2. The combine harvester according to claim 1, wherein the lower unsegmented portion comprises an upper planar portion having an edge, wherein the upper planar portion is planar with the upper segmented portion, and wherein each tab of the plurality of tabs extends at a first tab angle with respect to the edge, and wherein the first tab angle is less than 90°.

3. The combine harvester according to claim 1, wherein the lower unsegmented portion comprises an upper planar portion and a lower planar portion, wherein the upper planar portion is planar with the upper segmented portion, and wherein the lower planar portion is formed at a second tab angle with respect to the upper planar portion, and wherein the second tab angle is between 45° and 135°.

4. The combine harvester according to claim 1, wherein the lower unsegmented portion includes an upper planar portion, wherein the upper planar portion has an unsegmented height, wherein each tab of the plurality of tabs has a tab length and a tab width, and wherein the unsegmented height, the tab length and the tab width are constant.

5. The combine harvester according to claim 4, wherein the unsegmented height is 10 mm, the tab length is 44 mm and the tab width is 40 mm.

6. The combine harvester according to claim 1, wherein the tab gap is 40 mm.

7. The combine harvester according to claim 1, wherein the fan output duct has a bottom surface, and wherein the each of the at least one segmented air deflector is mounted to the bottom surface such that air flow through the fan output duct, generated by the fan, impacts the each air deflector at a deflection angle measured with respect to a normal to the upper segmented portion, the deflection angle greater than 0°.

8. The combine harvester according to claim 7, wherein the lower unsegmented portion of the each air deflector is L-shaped, and wherein the L-shaped lower unsegmented portion of the each air deflector is mounted to the bottom portion of the fan output duct.

9. The combine harvester according to claim 1, wherein the fan output duct has a first side surface and a second side surface, wherein the fan output duct has an upstream portion, a downstream portion and an upstream middle portion, and wherein a first of the at least one air deflector extends from the downstream portion of the output duct adjacent to the first side to the upstream middle portion of the output duct, and wherein a second of the at least one air deflector extends from the downstream portion of the output duct adjacent to the second side to the upstream middle portion of the output duct.

10. A fan assembly for use with a cleaning assembly of a combine harvester, the fan assembly comprising:
a fan housing having a fan output duct; and
a fan mounted to the fan housing, wherein
said fan assembly is configured to blow air across one or more cleaning sieves of the cleaning assembly via the fan output duct, and wherein
said fan output duct includes at least one segmented air deflector, each of the at least one segmented air deflector has an upper segmented portion and a lower unsegmented portion, the upper segmented portion includes a plurality of tabs, each of the plurality of tabs having the same dimensions, adjacent tabs of the plurality of tabs are separated by a tab gap, wherein the tab gap is constant, the unsegmented portion having a height that is constant.

11. The fan assembly according to claim 10, wherein the lower unsegmented portion comprises an upper planar portion having an edge, wherein the upper planar portion is planar with the upper segmented portion, and wherein each tab of the plurality of tabs extends at a first tab angle with respect to the edge, and wherein the first tab angle is less than 90°.

12. The fan assembly according to claim 10, wherein the lower unsegmented portion comprises an upper planar portion and a lower planar portion, wherein the upper planar portion is planar with the upper segmented portion, and wherein the lower planar portion is formed at a second tab angle with respect to the upper planar portion, and wherein the second tab angle is between 45° and 135°.

13. The fan assembly according to claim 10, wherein the lower unsegmented portion includes an upper planar portion, wherein the upper planar portion has an unsegmented height, wherein each tab of the plurality of tabs has a tab length and a tab width, and wherein the unsegmented height, the tab length and the tab width are constant.

14. The fan assembly according to claim 10, wherein the fan output duct has a bottom surface, and wherein the each of the at least one segmented air deflector is mounted to the bottom surface such that air flow through the fan output duct, generated by the fan, impacts the each air deflector at a deflection angle measured with respect to a normal to the upper segmented portion, the deflection angle greater than 0°.

15. A combine harvester, comprising:
a header assembly configured for collecting a crop;
a threshing assembly coupled to the header assembly, the threshing assembly configured for separating grains of the crop from material other than grain; and
a cleaning assembly positioned in association with the threshing assembly, the cleaning assembly configured for separating the grains from chaff, the cleaning assembly comprising:
a fan assembly including a fan housing having a fan output duct and a fan mounted to the fan housing; and
one or more cleaning sieves, wherein
said fan assembly is configured to blow air across the one or more cleaning sieves via the fan output duct, and wherein
said fan output duct includes at least one segmented air deflector having an upper segmented portion and a lower unsegmented portion, the upper segmented portion has a plurality of tabs, the lower unsegmented portion incudes a lower planar portion and an upper planar portion having an edge, wherein the upper planar portion is planar with the upper segmented portion, and wherein each tab of the plurality of tabs extends at a first tab angle with respect to the edge, and wherein the first tab angle is approximately 45°, the upper planar portion is planar with the upper segmented portion, and the lower planar portion is formed at a second tab angle with respect to the upper planar portion, the second tab angle being approximately 90°.

* * * * *